United States Patent [19]

Clark

[11] 4,330,965

[45] May 25, 1982

[54] TOOL FOR OPTICALLY FINISHING CONNECTOR-MOUNTED OPTICAL FIBERS

[75] Inventor: Kenneth M. Clark, Irvine, Calif.

[73] Assignee: Hughes Aircraft Company, Culver City, Calif.

[21] Appl. No.: 269,071

[22] Filed: Jun. 2, 1981

Related U.S. Application Data

[63] Continuation of Ser. No. 63,636, Aug. 3, 1979, abandoned.

[51] Int. Cl.³ ............................................. B24B 41/06
[52] U.S. Cl. ................................................ 51/217 R
[58] Field of Search ............. 51/216 R, 217 R, 217 P, 51/217 L, 283

[56] References Cited

U.S. PATENT DOCUMENTS

| | | | |
|---|---|---|---|
| 264,877 | 9/1882 | Heyer | 51/217 P |
| 2,922,657 | 1/1960 | Garrison | 51/217 R |
| 3,559,346 | 2/1971 | Pada | 51/283 |
| 3,587,196 | 6/1971 | Dunn | 51/283 |
| 3,868,794 | 3/1975 | Zitkus | 51/283 |

Primary Examiner—Harold D. Whitehead
Attorney, Agent, or Firm—Lewis B. Sternfels; W. H. MacAllister

[57] ABSTRACT

The axial position of the fiber is controlled in three grinding or polishing stages. The fiber (72) is first ground flush with the guide (120) in which it is housed. The fiber end and face of the guide are then ground flat and square. The fiber is thereafter polished to its optical quality and required length. The tool for accomplishing these steps includes a retainer (74) which holds the fiber optic ferrule (70) and its optical fiber (72) therein at a tool surface (16). This tool surface is protected by a guard (18) from being too rapidly ground away while the fiber and fiber/guide combination are ground flush with the surface. The surface and its retained guide and fiber are then moved to an unprotected position (FIG. 3) so that the surface and the fiber within its ferrule may be polished on a suitable polishing wheel or similar device.

16 Claims, 5 Drawing Figures

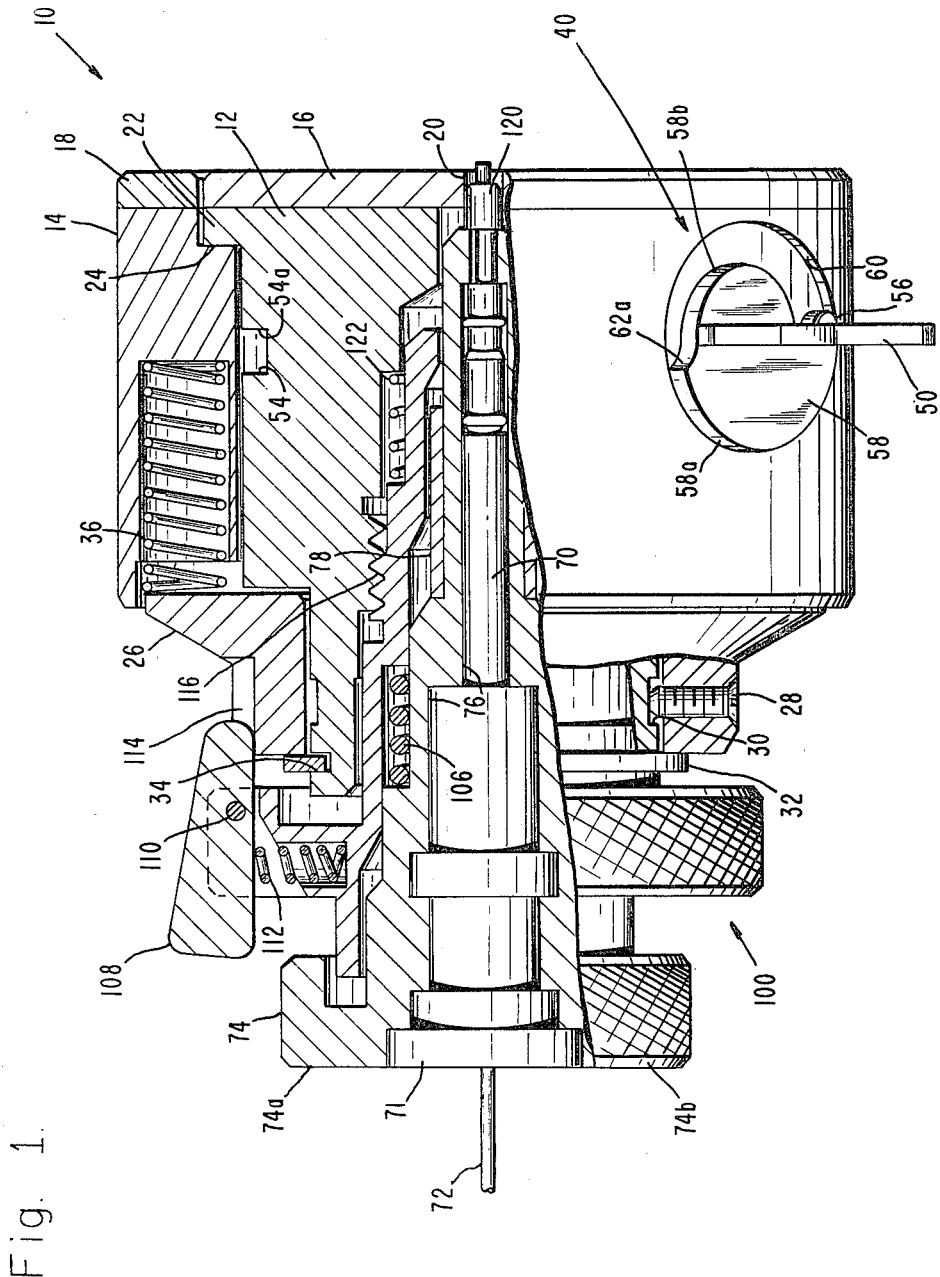

4,330,965

TOOL FOR OPTICALLY FINISHING CONNECTOR-MOUNTED OPTICAL FIBERS

This is a continuation application of Ser. No. 63,636 filed Aug. 3, 1979 and now abandoned.

TECHNICAL FIELD

The present invention relates to a tool and method which is useful in optically finishing the transmitting-/receiving end face of an optical waveguide.

CROSS-REFERENCE TO RELATED APPLICATIONS

The present invention has particular use for optically finishing the end face of the optical waveguide mounted in the fiber optic connector of co-pending patent application, Ser. No. 805,500, now abandoned in favor of continuing application, Ser. No. 65,032.

BACKGROUND ART

It is essential that, when optical fibers are to be mechanically coupled in a connect-disconnect mechanism, the mating ends of the fibers must be optically finished to preclude or, at least, to minimize losses in transmission through reflection or scattering of the transmitted signals at their end faces. There are many well known methods for providing an adequately finished fiber optic end, including proper cleavage of glass fiber, and polishing of the fiber ends when encapsulated or otherwise held within an optical fiber ferrule. While successful to a greater or lesser extent, improvements are still needed, especially where it is necessary to mass produce optically polished fiber ends by use of relatively unskilled labor.

SUMMARY OF THE INVENTION

The present invention accomplishes these and other objectives by controlling the axial position of the fiber in three grinding or polishing stages. The glass fiber is first ground flush with the guide in which it is housed. The fiber end and face of the guide are then ground flat and square. The fiber is thereafter polished to its optical quality and required length. The tool for accomplishing these steps, in its preferred embodiment, includes a retainer which holds the fiber optic contact or ferrule and its optical fiber therein at a tool surface. This tool surface is protected by a guard from being too rapidly ground away while the fiber and fiber/guide combination are ground flush with the surface. The surface and its retained guide and fiber are then moved to an unprotected position so that the surface and the fiber within its ferrule may be polished on a suitable polishing wheel or similar device.

It is, therefore, an object of the present invention to provide a means and a method by which an optical finish can be applied to the end face of an optical wave guide mounted for use in an optical fiber ferrule.

Another object is to provide for a three-stage grinding and polishing sequence to optically finish fiber end faces.

Other aims and objects as well as a complete understanding of the present invention will appear from the following explanation of an exemplary embodiment and the accompanying drawings thereof.

BRIEF DESCRIPTIONS OF THE DRAWINGS

FIG. 1 is a view of the preferred embodiment of the tool for grinding and polishing the end face of an optical fiber while mounted in its ferrule, the tool being shown in partial cross-section to illustrate the pre-grinding position of the fiber and its contact;

DETAILED DESCRIPTION OF THE INVENTION

Figure 2:
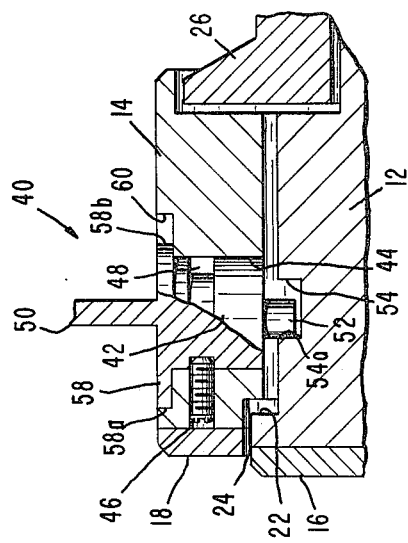
FIG. 2 is a partial view of the tool in cross-section showing the mechanism by which the grinding and polishing surface of the tool is moved from its grinding position to its polishing position.

Referring primarily to FIGS. 1 and 2, an adjustable hand-held fiber optic ferrule grinding and polishing tool 10 includes a body 12 of generally cylindrical configuration concentrically placed within a spring housing 14. For convenience, these as well as most other parts are all made of aluminum, except as otherwise indicated. For example, it is preferred that body 12 be provided with an end surface which is of a relatively softer material than the end surface of the end housing 14. Accordingly, the end surface of body 12 comprises a plate 16 of brass while the end surface of spring housing 14 comprises an annular limiting ring plate 18 of stainless steel. A centrally located hole 20 in plate 16 supports the end of a fiber optic contact.

At its forward end, body 12 has a radially extending flange 22 which is adapted to cooperate with a recess 24 in spring housing 14 to limit forward movement of the spring housing with respect to the body and, thereby, to ensure that the polishing and grinding surfaces of plates 16 and 18 are flush, one with respect to the other. It is to be understood that the surfaces of plates 16 and 18 do not have grinding and polishing abrasive materials in them, but are disposed to be placed against such materials on grinding and polishing wheels at appropriate times during grinding and polishing of the fiber optic contact end. For convenience of describing their use, however, they are termed "grinding" and "polishing" surfaces.

At the opposite end of body 12, an adjustable annulus 26 is secured to the body by a set screw 28 which is normally engaged within an annular recess 30 of the adjustable annulus. A retaining ring 32 residing within a recess 34 of the body prevents adjustable annulus 26 from slipping off the body when set screw 28 temporarily does not secure the body and the annulus together. Between the adjustable annulus and housing 14 are a plurality of generally symmetrically placed springs 36 which normally bias the spring housing and the body together at their contacting recess 24 and flange 22.

Figure 4:
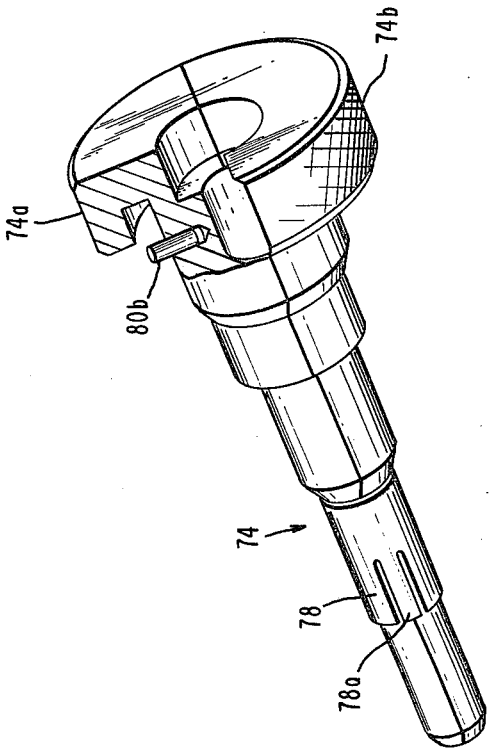
FIGS. 4 and 5 respectively depict a split cradle holder for the fiber optic ferrule, and an adjustable carrier for holding the split cradle to position the fiber optic ferrule with respect to a grinding and polishing surface of the tool.
Figure 3:
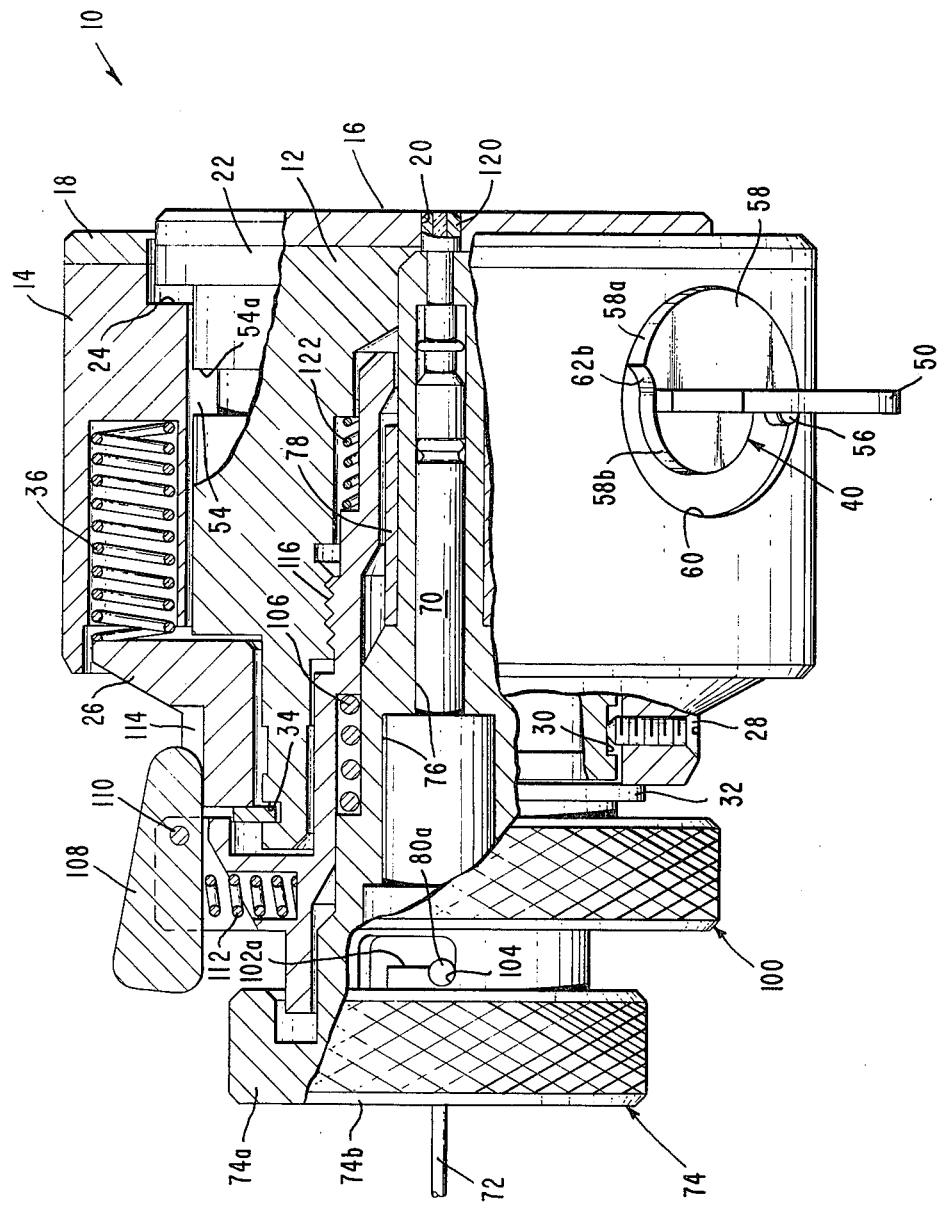
FIG. 3 is a view of the tool in partial cross-section at the step following grinding of the fiber and ferrule surface, but prior to the polishing thereof.

Movement between the body and the spring housing is effected by means of an eccentric cam 40 which is best shown in FIG. 2. Cam 40 comprises a cylindrical portion 42 which is rotatable within a cylindrical opening 44 of housing 14. A set screw 46 in the spring housing extends into an annular groove 48 of cylindrical portion 42 to retain the eccentric cam in position. Rotation of the cam is effected by turning a handle 50 which extends beyond the outer surface of housing 14. A pin 52, which is integral with cylindrical portion 42, projects beyond the internal surface of the housing and cooperates with an annular groove 54 in body 12. Cam 40 is adapted to rotate approximately 180 degrees so that pin 52 will abut against the forward edge 54a of groove 54 to compress springs 36 and to move body 12 and its plate 16 forward of housing 14 and its plate 18, as illustrated in FIG. 3. The width of groove 54 is such that flange 22 and recess 24 contact before pin 52 makes contact with rear surface 54b of groove 54. Rotation of eccentric cam 40 is limited by means of a pin 56 (see FIGS. 1 and 3) which is secured within spring housing 14 and which is contacted by stops 62a and 62b on a plate 58 having a stepped periphery. The plate has a larger periphery 58a, whose radius is the same as that of a hole 60 within housing 14, and a smaller periphery 58b whose radius is less than that of hole 60. The points, at which peripheries 58a and 58b meet, define a pair of generally radial surfaces 62a and 62b, respectively shown in FIGS. 1 and 4. Radial surfaces 62a and 62b act as stops which contact stationary pin 56 to limit rotation of cam 40.

Figure 5:
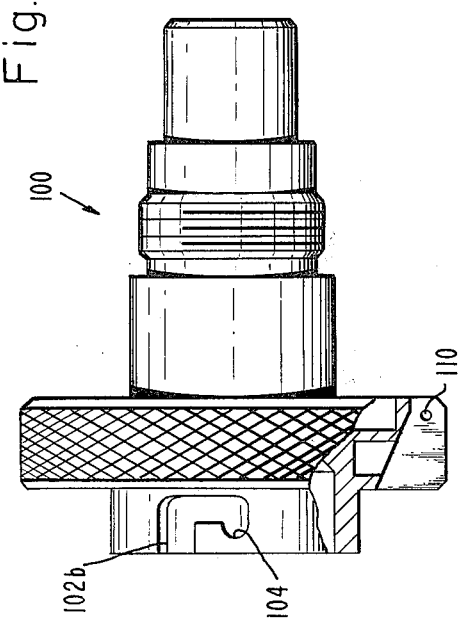

A contact or ferrule 70 having an optical fiber 72 therein is retained within body 12 by a split cradle 74 (see also FIG. 4) and an adjustable carrier 100 (see also FIG. 5). Ferrule 70 is adapted to be housed within split cradle 74, which comprises a pair of mating halves 74a and 74b. The split cradle has internal surfaces 76 which are configured as the exterior of ferrule 70 and its strain relief so that the latter may be placed within the first cradle half over which the second half is placed. A sleeve 78 with at least one tine 78a is adapted to slip slip over the front portion of cradle 74 to maintain the two halves together. A pair of diametrically opposed pins 80a and 80b, respectively shown in FIGS. 3 and 4, extend from each cradle half.

The assembled cradle is received and held within adjustable carrier 100, see also FIG. 5. A pair of U-shaped slots 102a and 102b are diametrically placed at the rear end of the adjustable carrier and open at one leg towards the carrier's rear. The other leg of the U-shaped legs terminates at a closed end surface 104, against which cradle pins 80 rests, under the bias of a spring 106 compressed between the carrier and the split cradle.

A key 108 is pinned to a pivot 110 on the periphery of carrier 100 and is biasable by a spring 112 into contact with a slot or keyway 114 formed in the periphery of adjustable annulus 26 in order to lock the adjustable annulus and carrier together and, as a consequence, the adjustable carrier to body 12. Adjustable carrier 100 further is coupled at threads 116 with body 12 so that, when key 108 is pivoted out of engagement with keyway 114, carrier 100 and its contained contact 70 may be screwed into or out of body 12. Inasmuch as ferrule or contact 70 terminates in an optical fiber bushing 120 which is received in hole 20, the threaded connection at 116 permits bushing 120 to be positioned adjacent the surface of brass squaring plate 16. A spring 122 is placed between adjustable carrier 100 and body 12 to effect a relatively tight fitting therebetween.

An adjustment mechanism for the proper positioning of bushing 120 is needed, because the surfaces of plates 16 and 18 are subject to wear through grinding and polishing operations, and eventually their thicknesses are reduced. Specifically, bushings 120 are generally all of the same axial length and it is important that, before the initial grinding and polishing operations, the surface of bushing 120 be flush with the surface of plate 16. The adjustment to make the surfaces flush with one another is effected through the intermediary of the attachment between adjustable annulus 26 and plate 12. First, set screw 28 is loosened so that adjustable carrier 100 and adjustable annulus 26 may be made to rotate together through the latching between key 108 and keyway 114. Rotation of these latched together parts through the intermediary of screw threads 116 permits the surface of bushing 120 to be moved toward or away from the end surface of plate 16. At the point that the end surfaces of bushing 120 and plate 16 are flush or where the bushing surface barely extends beyond the plate surface, set screw 28 is tightened. In this position, the tool is ready for the initial grinding operation.

Subsequent to this adjustment, tool 10 is used as follows. Ferrule 70, as connected to fiber 72 and its strain relief housing 71, is mounted in cradle half 74a or 74b. The cradle is closed by adding the second half to enclose the contact and its strain relief housing. Sleeve 78 is then slid over the nose of cradle 74 to stabilize the assembly. The cradle is then inserted into adjustable carrier 100 against the bias of spring 106 as lock-in pins 80a and 80b are slipped into slots 102a and 102b, followed by an approximate 30 degree clockwise rotation so that the pins will be resiliently held against surfaces 104 by force of spring 106.

The tool is then readied for the initial grinding operation, after the factory adjustment using set screw 28, as described above. Preferably, a 3000 grit diamond wheel is utilized. For this grinding operation, stainless steel ring plate 18 must be flush with brass plate 16, as properly positioned by key device 40 when flange 22 abuts against recess 24. The tool face is then placed onto the grinding surface of the diamond wheel. During grinding, key 108 is unlatched from engagement with keyway 114 and adjustable carrier 100 is slowly turned clockwise one revolution until key 108 again relatches with the keyway. This operation causes bushing 120 and its contained fiber 72 to be slightly ground, the purpose primarily being to grind the protruding fiber flush with guide bushing 120. The tool may be flushed with clean water to remove any debris left from the grinding operation.

Steel limiting ring 18 is then retracted by rotation of eccentric cam 40. This movement retracts spring housing 14 as shown in FIG. 3. Brass plate 16, the bushing surface, and the fiber end are then placed against a phenolic polishing wheel wetted preferably with a three micron cerium oxide emulsion. After proper polishing, the polished ferrule is removed by reversing carrier 100 by one revolution by unlatching and relatching key 108 with keyway 114. Cradle assembly 74 is then removed from adjustable carrier 100 by pushing the cradle against spring 106 and rotating it counter-clockwise to disengage pins 80a and 80b from slots 102a and 102b.

Although the invention has been described with reference to a particular embodiment thereof, it should be realized that various changes and modifications may be made therein without departing from the spirit and scope of the invention.

I claim:

1. An adjustable optical fiber grinding and polishing tool capable of being held in an operator's hand comprising:

a body having means for supporting at least one fiber optic ferrule and its optical fiber and for positioning the ferrule and its fiber terminus at a surface on said body;

a housing surrounding said body and having a surface generally surrounding said body surface; and means interconnecting said housing and said body for effecting relative movements of retraction and extension therebetween and including mechanism defining limits to the relative movements, respectively to place said body and housing surfaces in a coplanar position prior to grinding of the ferrule and its fiber terminus and to move said body surface into a position forward of said housing surface prior to said polishing of the ferrule and its fiber terminus.

2. An adjustable, hand-holdable optical fiber grinding and polishing tool comprising:

a body having means, for retaining a fiber optic ferrule and its optical fiber therein, to position the ferrule and its fiber terminus at a surface on said body;

a housing surrounding said body and having a surface generally surrounding said body surface; and means interconnecting said housing and said body for effecting relative movements of retraction and extension therebetween, respectively to place said body and housing surfaces in a coplanar position prior to grinding of the ferrule and its fiber terminus and to move said body surface into a position forward of said housing surface prior to polishing of the ferrule and its fiber terminus, and comprising means between said body and said housing normally biasing said body and housing surfaces into the coplanar position, and means intercoupling said body and said housing and operable against said biasing means to extend said body to its forward position.

3. A tool according to claim 2 wherein said intercoupling means comprises a member which is rotatable in said housing about an axis passing through said body, a pin secured to and extending from said member along a line which is parallel to the member axis, and a recess in said body into which said pin extends whereby, upon rotation of said member in said housing, said pin bears against a wall of the body recess to cause the extension of said body to its forward position relative to said housing.

4. A tool according to claim 3 further including means on said housing and said member for contact therebetween to define limited rotation of said member.

5. A tool according to claim 3 further comprising contactable faces on said body and said housing defining a limit of the retraction of said body into said housing upon rotation of said member, said recess being larger than said pin to permit contact of said faces.

6. A tool according to claim 5 wherein said housing surface is formed from a material which is harder than that of said body surface to limit removal of the body surface material and the contact and its fiber terminus.

7. A tool according to claim 6 further including ferrule positioning means coupled between said body and the ferrule for positioning the ferrule and its fiber terminus with respect to said body surface.

8. An adjustable, hand-held optical fiber grinding and polishing tool comprising:

a body having a carrier in threaded engagement therewith for retaining a fiber optic ferrule and its optical fiber therein and for defining the position of the ferrule end and its fiber terminus with respect to a surface on said body;

a housing surrounding said body and having a surface generally surrounding said body surface; and structure interconnecting said housing and said body for effecting relative movements of retraction and extension therebetween and including at least two stops defining limits to the relative movements, respectively to place said body and housing surfaces in a coplanar position prior to grinding of the ferrule and its fiber terminus and to move said body surface into a position forward of said housing surface prior to polishing of the ferrule and its fiber terminus.

9. A tool according to claim 8 further including means between said carrier and said body for effecting fine adjustment of the position of the ferrule end and its fiber terminus at said body surface.

10. An adjustable, hand-held optical fiber grinding and polishing tool comprising:

a body having a carrier in threaded engagement therewith for retaining a fiber optic ferrule and its optical fiber therein and for defining the position of the ferrule end and its fiber terminus with respect to a surface on said body;

means between said carrier and said body for effecting fine adjustment of the position of the ferrule end and its fiber terminus at said body surface, and including an annulus secured to said body and having slotted means thereon and a key secured to said carrier and engageable with said slotted means to define points of non-rotatable positions of the threaded engagement between said carrier and said body and, thereby, the position of the ferrule end and its fiber terminus at said body surface;

a housing surrounding said body and having a surface generally surrounding said body surface; and means interconnecting said housing and said body for effecting relative movements of retraction and extension therebetween, respectively to place said body and housing surfaces in a coplanar position prior to grinding of the ferrule and its fiber terminus and to move said body surface into a position forward of said housing surface prior to polishing of the ferrule and its fiber terminus.

11. A tool according to claim 10, wherein said slotted means comprises a keyway and said annulus is rotatable on said body, and further including means non-rotatably affixing said annulus to said body at any 360 degree position of said keyway, thereby to define the points of the non-rotatable positions.

12. A tool according to claim 11, further including a split cradle insertable in said carrier and comprising a pair of halves having a cavity for receiving and holding the ferrule, a sleeve snugly fittable about said cradle to hold the halves together, pins symmetrically positioned about and extending from said cradle, retaining slots on said carrier engageable with said symmetrically positioned pins, and means between said cradle and said carrier for biasing said symmetrically positioned pins against said retaining slots for retaining said cradle within said carrier.

13. A tool according to claim 11 wherein said housing surface is formed from a material which is harder than that of said body surface to limit removal of material from the body surface, said ferrule and its fiber terminus.

14. A tool according to claim 1 wherein said housing surface is formed from a material which is harder than that of said body surface to limit removal of the body surface material and the contact and its fiber terminus.

15. A tool according to claim 14 further including ferrule positioning means coupled between said body and the ferrule for positioning the ferrule and its fiber terminus with respect to said body surface.

16. An adjustable, hand-held optical fiber grinding and polishing tool comprising:

a body;

a split cradle insertable in said body and comprising a pair of halves having a cavity for receiving and holding at least one fiber optic ferrule and its optical fiber and for defining the position of the ferrule end and its fiber terminus with respect to a surface on said body;

means for holding said cradle halves together;

a housing surrounding said body and having a surface generally surrounding said body surface; and means interconnecting said housing and said body for effecting relative movements of retraction and extension therebetween, respectively to place said body and housing surfaces in a coplanar position prior to grinding of the ferrule and its fiber terminus and to move said body surface into a position forward of said housing surface prior to polishing of the ferrule and its fiber terminus.

* * * * *